(12) United States Patent
Zortea et al.

(10) Patent No.: US 8,019,028 B1
(45) Date of Patent: Sep. 13, 2011

(54) RUN-LENGTH BASED SPECTRAL ANALYSIS

(75) Inventors: Anthony Eugene Zortea, Pipersville, PA (US); Matthew McAdam, Vancouver (CA)

(73) Assignee: PMC-Sierra, Inc., Santa Clara, CA (US)

( * ) Notice: Subject to any disclaimer, the term of this patent is extended or adjusted under 35 U.S.C. 154(b) by 762 days.

(21) Appl. No.: 12/055,948

(22) Filed: Mar. 26, 2008

(51) Int. Cl.
*H04L 1/00* (2006.01)
(52) U.S. Cl. ........ 375/346; 375/316; 375/285; 327/310; 327/384; 327/511; 348/607; 455/296
(58) Field of Classification Search .................. 375/346, 375/316, 285; 327/310, 384, 511; 348/607; 455/296
See application file for complete search history.

(56) References Cited

U.S. PATENT DOCUMENTS

| | | | |
|---|---|---|---|
| 4,490,682 A | | 12/1984 | Poulo |
| 5,625,632 A * | | 4/1997 | Ishida et al. ................. 714/769 |
| 6,753,727 B2 | | 6/2004 | Magoon et al. |
| 6,897,700 B1 | | 5/2005 | Fu et al. |
| 7,132,861 B1 | | 11/2006 | Fu et al. |
| 2006/0209884 A1* | | 9/2006 | MacMullan et al. .......... 370/465 |
| 2006/0279440 A1* | | 12/2006 | Zhao et al. ...................... 341/67 |
| 2007/0189195 A1* | | 8/2007 | Belotserkovsky ............ 370/315 |
| 2007/0268407 A1* | | 11/2007 | Rea et al. ...................... 348/572 |
| 2008/0009257 A1 | | 1/2008 | Safarian et al. |
| 2008/0009258 A1 | | 1/2008 | Safarian et al. |
| 2008/0191914 A1* | | 8/2008 | Van Veldhoven ............. 341/139 |
| 2009/0197556 A1* | | 8/2009 | Iwakuni ..................... 455/226.3 |

FOREIGN PATENT DOCUMENTS

WO  WO 2008001604  * 1/2008

OTHER PUBLICATIONS

Safarian, et al; Integrated Blocker Filtering RF Front Ends; Radio Frequency Integrated Circuits (RFIC) Symposium; Jun. 3-5, 2007; pp. 13-16; 2007 Institute of Electrical and Electronics Engineers (IEEE).

USPTO; Office Action dated Apr. 20, 2009 of U.S. Appl. No. 12/019,535 (filed Jan. 24, 2008).

* cited by examiner

*Primary Examiner* — Kenneth Lam
(74) *Attorney, Agent, or Firm* — Knobbe Martens Olson & Bear LLP

(57) ABSTRACT

Apparatus and methods determine a frequency associated with a relatively strong interfering signal (interferer) using relatively simple run-length counting techniques. Counts of run-lengths can be analyzed to estimate a frequency of the interferer. For example, a peak run-length can be associated with a frequency. In one embodiment, counts of run-lengths are used to construct a theoretical peak run-length, which is then associated with a frequency for the interferer. A theoretical count associated with the theoretical peak run-length can also be used as an indication of a signal strength of the interferer.

20 Claims, 8 Drawing Sheets

RUN-LENGTH BASED SPECTRAL ANALYSIS

BACKGROUND

1. Field of the Invention

The invention generally relates to electronics. In particular, the invention relates to spectral analysis.

2. Description of the Related Art

Co-existence of wireless communication links from different wireless standards, and a generally crowded wireless spectrum results in "interfering" radio signals near the frequency of a desired radio signal to be received, as illustrated in FIG. 1.

In an extreme case, the presence of a relatively large interferer near the desired signal makes reception of the desired signal impossible. Even in a relatively good case, the ability to handle a relatively large interferer increases the linearity and baseband filtering requirements of the radio, which in turn increases the radio's cost and power.

One conventional solution to the problem of a large interferer is to increase the linearity and increase the analog baseband requirements of the radio front end. This approach increases both the cost and the power used by the radio.

In another approach illustrated in FIG. 2, the interfering signal is separated at baseband, then up-converted to RF and subtracted from the total RF signal. See Aminghasem Safarian, et al., *Integrated Blocker Filtering RF Front Ends, Radio Frequency Integrated Circuits (RFIC) Symposium*, Jun. 3-5, 2007, 2007 Institute of Electrical and Electronics Engineers (IEEE), pp. 13-16.

SUMMARY

An interference scanner can efficiently determine the presence and frequency of an interfering signal (interferer). An RF spectrum can be downconverted to baseband. During the downconversion, the interferer is also downconverted. Counts of run-lengths from the sign of a baseband signal can be analyzed to estimate a frequency (in baseband) of the interferer. For example, a peak occurrence run-length can be associated with a frequency. In one embodiment, counts of run-lengths are used to construct a theoretical peak occurrence run-length, which is then associated with a frequency for the interferer. A local oscillator frequency used for downconversion can then be used to map the frequency of the interferer back to radio frequency.

BRIEF DESCRIPTION OF THE DRAWINGS

These drawings and the associated description herein are provided to illustrate specific embodiments of the invention and are not intended to be limiting.

DETAILED DESCRIPTION OF SPECIFIC EMBODIMENTS

Although particular embodiments are described herein, other embodiments of the invention, including embodiments that do not provide all of the benefits and features set forth herein, will be apparent to those of ordinary skill in the art.

Figure 1:
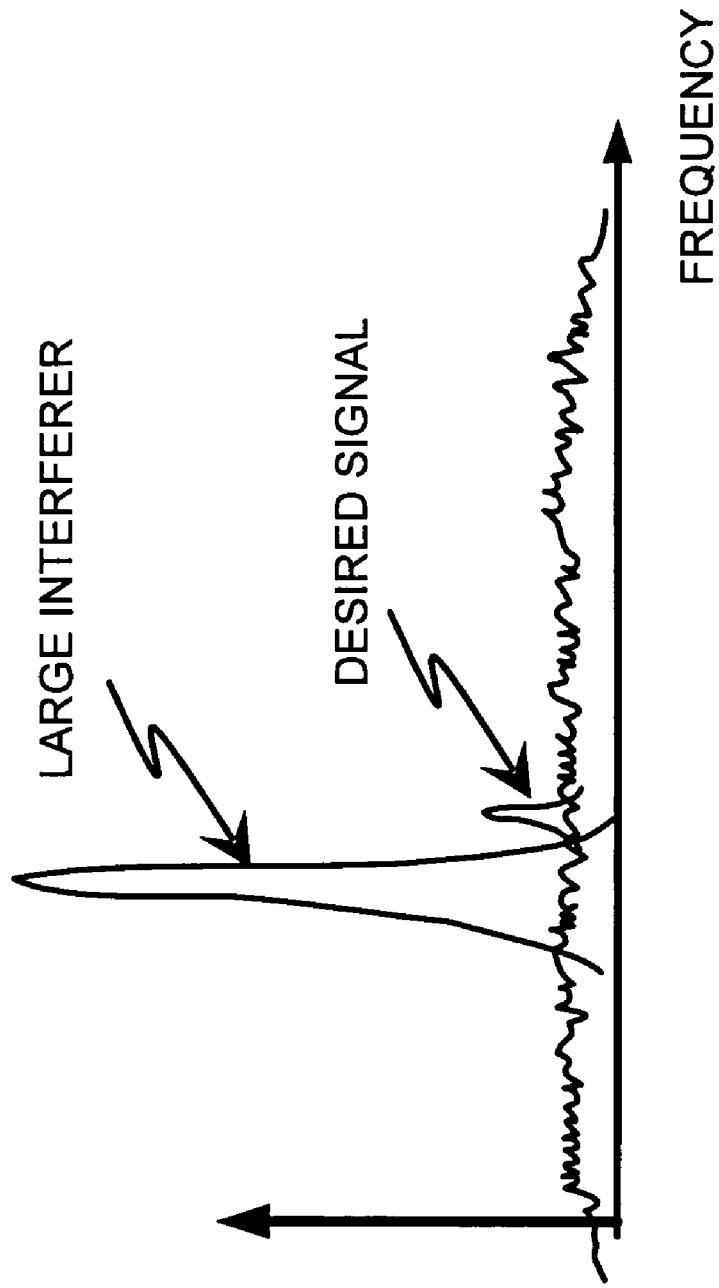
FIG. 1 illustrates an example of a spectrum of a received signal.
Figure 2:
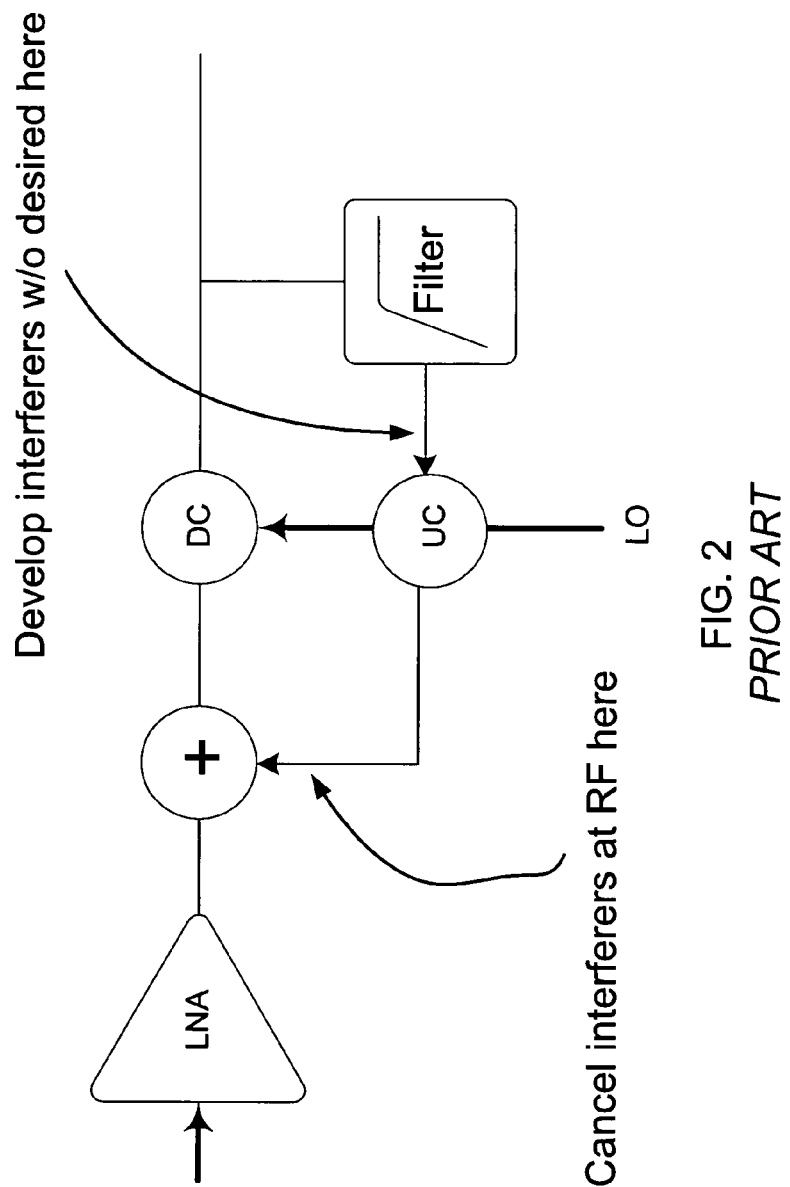
FIG. 2 illustrates an example of a prior art system.

To adequately receive the desired signal in the presence of a large interferer as shown in FIG. 1, a designer is typically faced with one of two choices: (1) increase the linearity and baseband filtering requirements of the radio; or (2) notch out the interferer earlier in the chain, at radio frequency, and relax the linearity and baseband filtering requirements of the radio. Choice 1 is a typical conventional approach.

Choice 2 uses a relatively high precision center frequency and a relatively high Q notch filter. For example, the desired and interfering signals may be separated by as little as a few MHz. An example of a ratio of carrier frequency to center frequency or filter transition band is expressed in Equation 1.

$$\frac{F_{seperation}}{F_{carrier}} = \frac{5 \text{ MHz}}{3.5 \text{ GHz}} \approx 0.1\% \qquad \text{Equation 1}$$

Equation 1 illustrates that the ratio of filter frequencies to carrier frequency is relatively small. The high-Q nature of the filter may be managed using a resonating tank circuit, but the center frequency precision will typically be controlled with an active control loop. An applicable high-Q filter will be readily determined by one of ordinary skill in the art.

Figure 3:
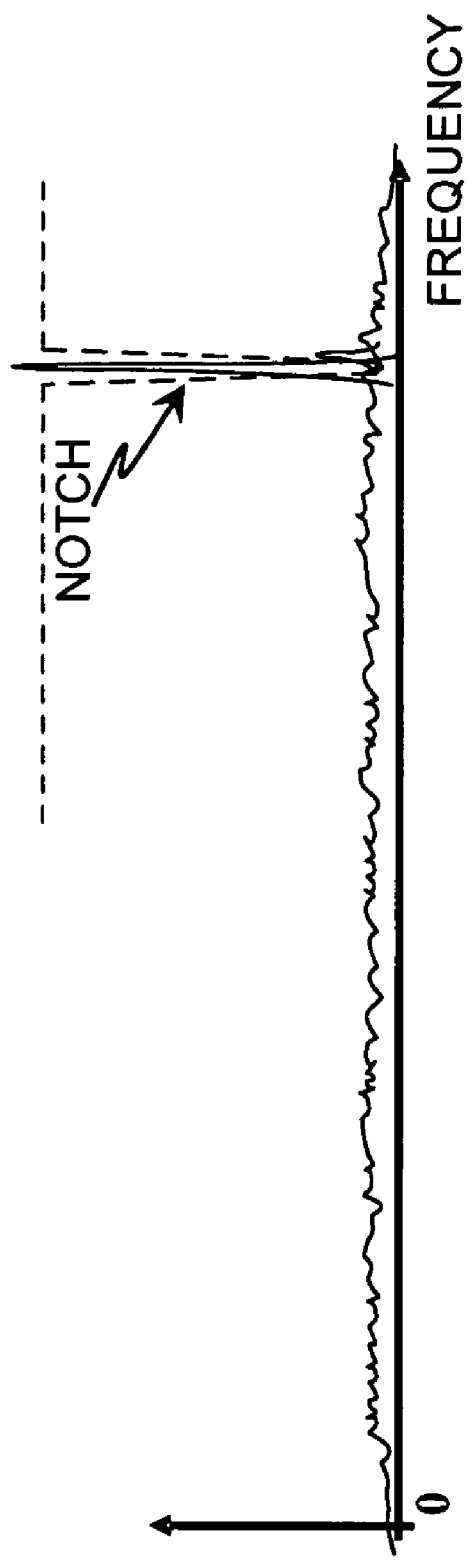
FIG. 3 illustrates signals and a notch.

FIG. 3 illustrates signals and a notch, with the chart extending to DC (0 frequency). The interferer location and strength can be assessed by an interference scanner, which will described in further detail later. In one embodiment, the effectiveness of notch filtering is assessed by the interference scanner.

Typically, the active control loop of the high-Q filter will use an estimate of the center frequency of the interferer. Techniques to estimate the center frequency will now be described.

Figure 4:
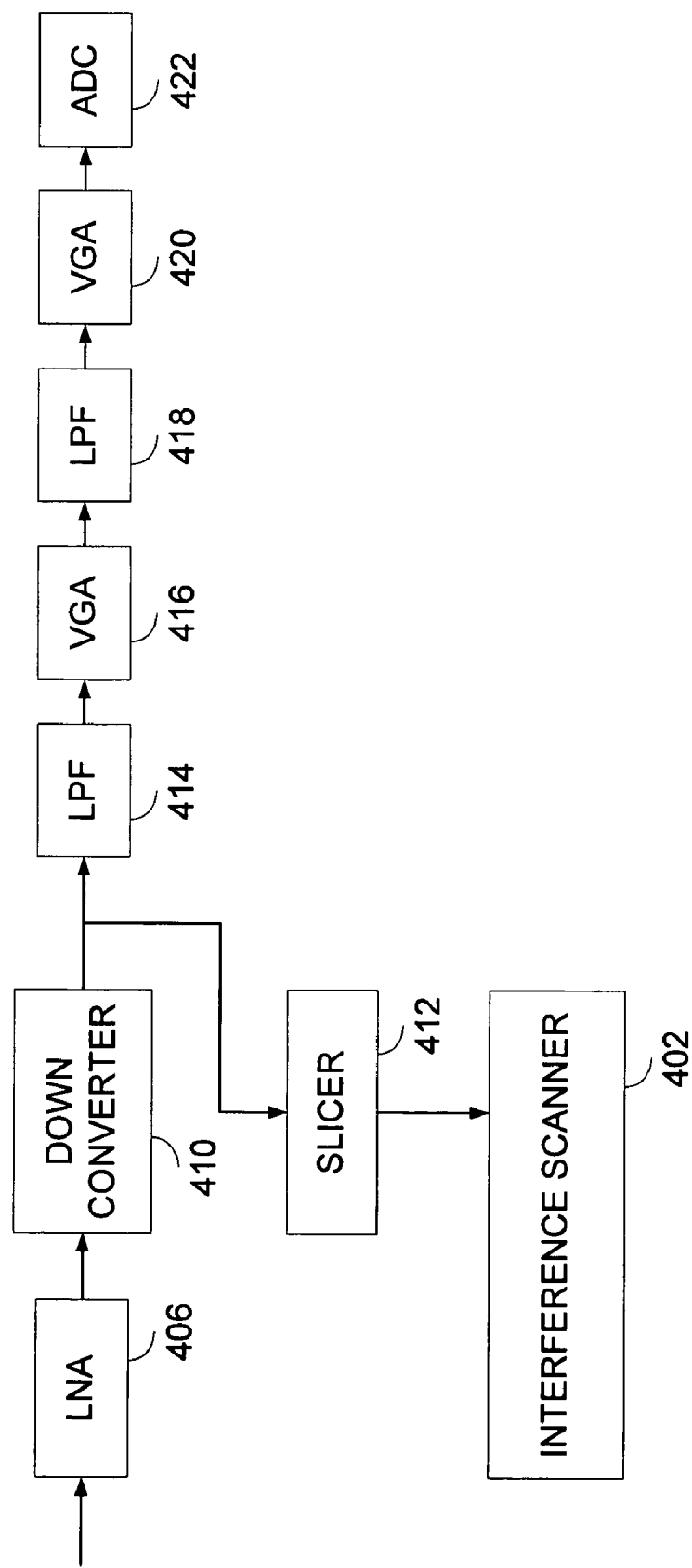
FIG. 4 illustrates a top-level architecture a front-end of a receiver using an interference scanner in an adaptive interference cancellation block.

FIG. 4 illustrates a top-level architecture a front-end of a receiver using an interference scanner 402. Note that interferers at RF appear as high frequency signals at baseband, as shown in FIG. 5.

RF signals, including the desired signal and one or more interferers, are received by a low-noise amplifier (LNA) 406. The RF signals from the LNA 406 are converted to baseband by a down converter 410.

An output of the down converter 410 is provided to a slicer 412 and to other components 414, 416, 418, 420, 422 of the receiver front-end. In the illustrated embodiment, the slicer 412 samples the output of the down converter 410 and determines whether the output is positive or negative. For example, the slicer 412 can generate hard symbols of zero or one from the output of the down converter 410. The output of the slicer 412 is provided to the interference scanner 402. The interference scanner 402 will be described later in greater detail. The other components 414, 416, 418, 420, 422 can be arranged in a variety of ways, including, but not limited to, conventional ways.

Figure 5:
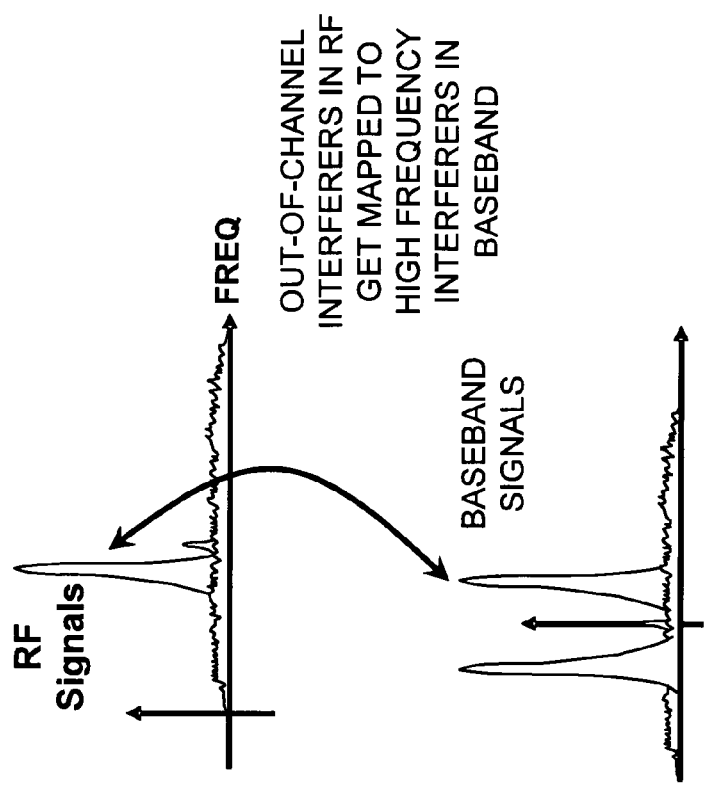
FIG. 5 illustrates an interferer originally in RF and mapped to baseband.

With reference to FIG. 5, interferers appear as high-frequency baseband signals. The probability of a zero-crossing per unit time from the output of the slicer 412 (FIG. 4) increases as the strength and frequency of the interferer increases. The output of the slicer 412 (FIG. 4) can be used to determine the zero-crossing of the down-converted signal; therefore shorter runs of ones or zeroes should be expected as the frequency of the interferer increases. For example, counters can be used to count the length of runs of ones or zeroes from the output of the slicer 412 (FIG. 4).

Figure 6:
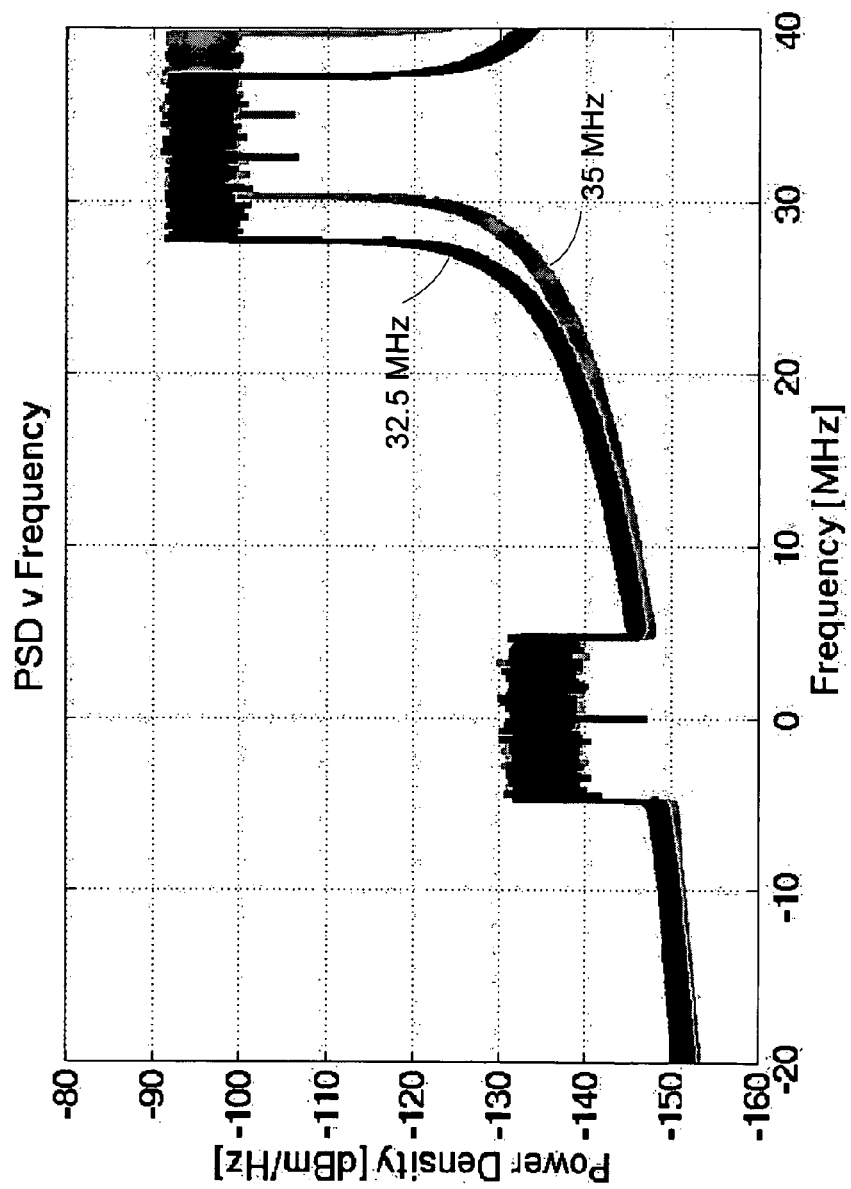
FIG. 6 is an overlay of two spectra with interferers in slightly different locations (32.5 MHz and 35 MHz frequency offsets).

Consider two cases: one in which an interferer is 3.25*BWdes away from the desired signal, and another in which an interferer is 3.5*BWdes away, wherein BWdes is the bandwidth of the desired signal. For this example, the bandwidth BWdes=10 MHz, so the interferers are at 32.5 MHz and 35 MHz frequency offsets. The spectra of the two cases are shown in FIG. 6.

Figure 7:
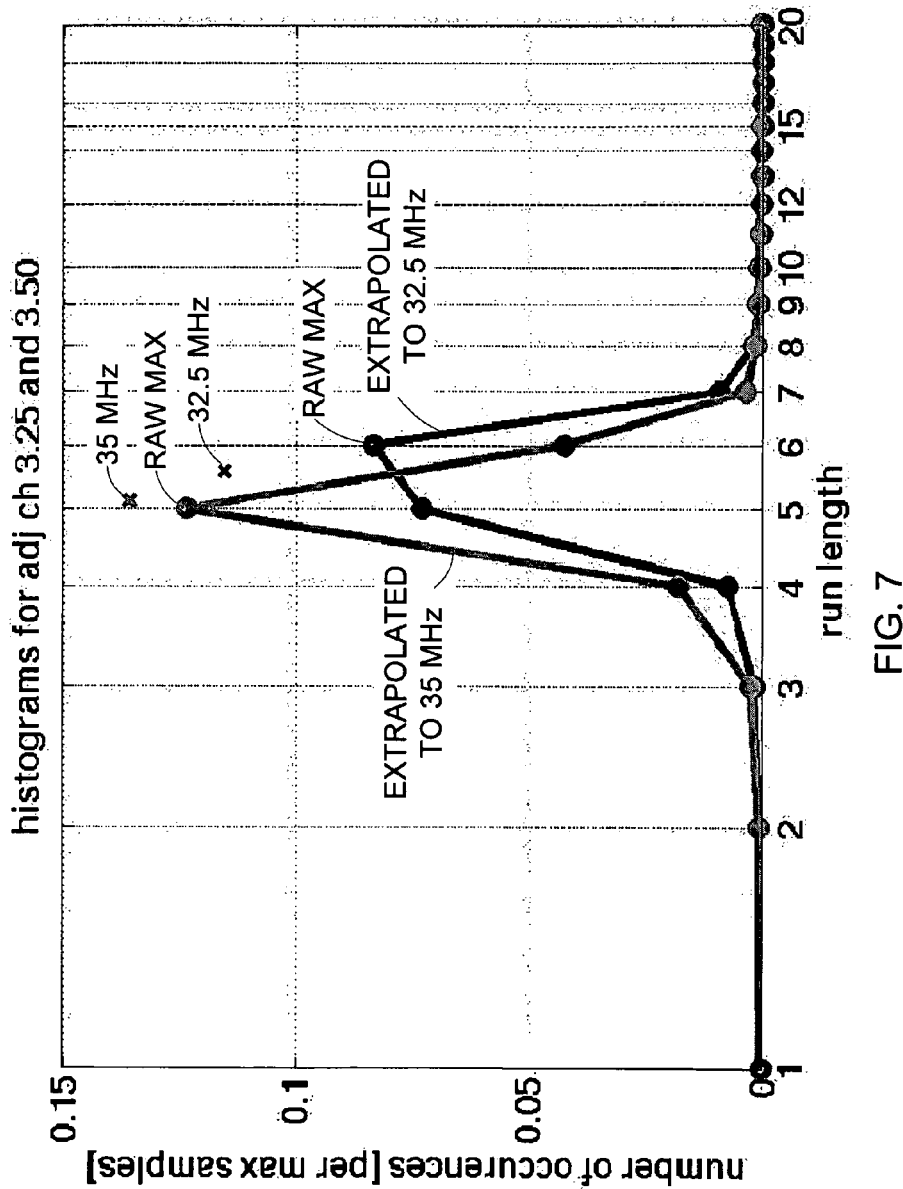
FIG. 7 is an overlay of two histograms of run-lengths of slicer output for two different interferer signals.

A histogram of run-lengths from the output of the slicer 412 (FIG. 4) for these two cases (32.5 and 35) are overlaid and shown in FIG. 7. The histogram represents frequency of occurrence distribution of run-lengths encountered. Note that the peak occurrence run-length falls at run-length 5 for the interferer at 35 MHz frequency offset, and at run length 6 for the interferer at 32.5 MHz frequency offset. To clarify, peak occurrence run-length means the run-length value with the highest frequency of occurrence in the frequency distribution and not the maximum length of the runs of zeroes and/or ones encountered.

This data represented in the histogram raises 2 questions: (1) what is the relationship of run-length to interferer center frequency; and (2) run-lengths are discrete counts (natural number counts), but the interferer center frequency can be any frequency.

In one embodiment, equation 2 is used to convert a run-length to a signal frequency.

$$F_{runlegnth} = \frac{F_{samp}/2}{RL} \quad \text{Equation 2}$$

Figure 8:
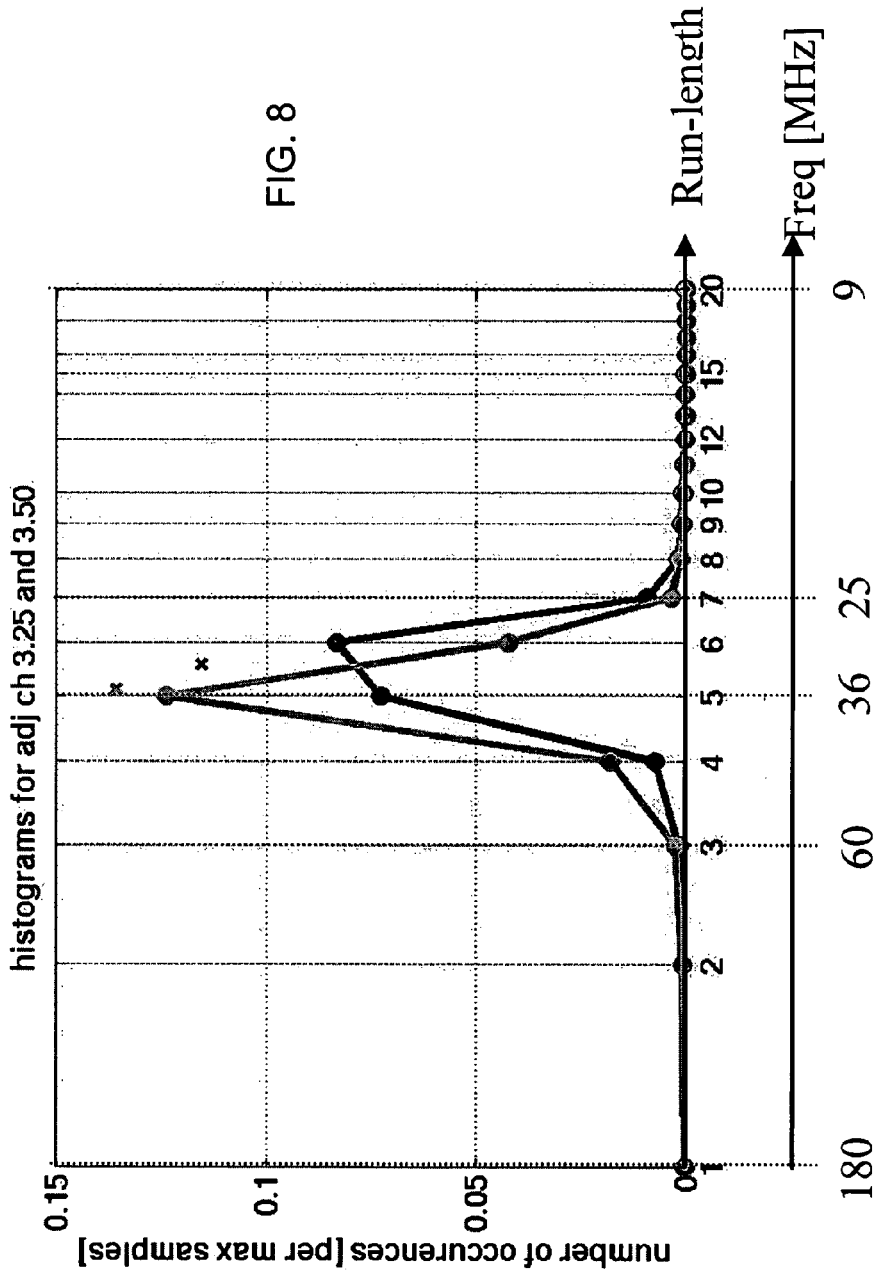
FIG. 8 illustrates a relationship of run-length to frequency

In Equation 2, $F_{runlength}$ is the frequency of the interferer, $F_{samp}$ is the sampling frequency of the slicer 412 (FIG. 4), and RL is the count of the run length (count of consecutive ones or consecutive zeroes). Using Equation 2, the run-length axis can be associated with frequency, as shown in FIG. 8. The run-length (x-axis value) with the peak frequency of occurrence can be used to estimate a frequency of the interfering signal. Alternatively or in addition to the foregoing, an estimate of a signal strength of the interfering signal relative to a signal strength of the desired signal can be determined by examination of the value of the peak frequency of occurrence (y-axis). The estimated interfering signal strength can be used to determine whether to activate an interference filter, to assess the effectiveness of a particular interference filter configuration, to determine whether to adjust or tune an interference filter, or the like.

The run-lengths RL are of course discrete counts. For example, there cannot be a peak run length of 5.3 counts. The peak run length will be a discrete count, such as 5 or 6 counts in the illustrated example. However, data other than just the peak run length can also be used to evaluate a frequency of the interferer or a magnitude of the interferer. This other data is represented by the shape of the histogram. For example, points that are near the maximum frequency of occurrence run length can be used to estimate where the peak occurrence for run-length would have fallen if there had been a continuous run-length axis or a finer resolution count (faster sampling rate), that is, a non-natural number peak run-length. Techniques can also estimate where on the y-axis the maximum run-length would have fallen.

In the illustrate embodiment, the following Matlab® function can be used to estimate the continuous coordinates of the run-length with the maximum number of occurrences.

```
function [xmax,ymax] = findPeak(rls,fsamp);
%-- estimates the continuous co-ordinates of the maximum run-length
%-- and converts the maximum run-length to frequency
%-- inputs:
%-- rls == histogram of run-lengths
%-- fsamp == slicer sampling frequency
%-- outputs:
%-- xmax == maximum run-length, converted to frequency of
maximum interferer
%-- ymax == number of occurrences of maximum run-length
%-- get max rl and neighbors
mp = find(rls==max(rls));
if (mp==1 | mp==length(rls));
    xmax = fsamp/2/mp;
    ymax = max(rls);
else
    vec = rls(mp-1:1:mp+1);
    xn = mp-1; yn=vec(1);
    xp = mp; yp=vec(2);
    xb = mp+1; yb=vec(3);
    if (vec(1)<=vec(3))
        xpeak = (xn*yb – xp*yb + xb*yn + xp*yn – xb*yp – xn*yp)/
        (2*yn – 2*yp);
        ymax = (xpeak–xn)*(yp–yn)/(xp–xn) + yn;
    else
        xpeak = (xn*yb + xp*yb + xb*yn – xp*yn – xb*yp – xn*yp)/
        (2*yb – 2*yp);
        ymax = (xpeak–xb)*(yb–yp)/(xb–xp) + yb;
    end;
    xmax = fsamp/2/xpeak;
end;
```

The above algorithm performs a linear extrapolation around the "raw" or discrete max to estimate an extrapolated max value. While the term extrapolation is used, the estimated data is within the run-length of the data (x-axis), but is outside the domain of the counted frequency of occurrence data (y-axis). The illustrated Matlab® function assumes that the peak is shaped like a simple "triangle" near the raw maximum (discrete count maximum). Visually, the algorithm can be observed in the graph of FIG. 7 by extrapolating the lines near the maximum of the two curves. The extrapolated data is represented by two "x" marks on the graph. The extrapolated peak is calculated to lie on a line that is formed by the raw maximum point and the nearest neighbor point that is farthest away from it, such as the adjacent point that has the lower count.

For example, the points with run lengths 6 (maximum) and 7 (adjacent with lower count) are used for the curve that is extrapolated to a 32.5 MHz peak. For example, the points with run lengths 4 (maximum) and 5 (adjacent with lower count) are used for the curve that is extrapolated to a 35 MHz peak. The extrapolated peak is determined to be located at the intersection of said line and another line formed by negating the slope (changing the sign of the slope) of said line and passing said line through the nearest neighbor point that is closest to the maximum, such as the other adjacent point (point at run length 5 for the 32.5 MHz peak and the point at run length 6 for the 35 MHz peak). The foregoing illustrates that the extrapolated x-axis value (non-natural number run length) can be used to estimate a frequency of the interfering signal.

In addition, alternatively or in addition to the foregoing, an estimate of a signal strength of the interfering signal relative to a signal strength of the desired signal can be determined by examination of the magnitude of the extrapolated peak (y-axis). The estimated interfering signal strength can be used to determine whether to activate an interference filter, to assess the effectiveness of a particular interference filter configuration, to determine whether to adjust or tune an interference filter, or the like.

The foregoing algorithm can be implemented via hardware, firmware, software, or by a combination of the foregoing. For example, a microprocessor, microcontroller, or other processor can be used to assess the interferer frequency. Using such techniques, such as the foregoing algorithm, the coordinates of the peak of the interferer, which for the example of FIG. 7, is shown below in FIG. 8. The frequency for the interferer as mapped in baseband versus run length count is expressed along a second horizontal axis of FIG. 8. A frequency associated with a local oscillator for the downconverter can be used to remap the baseband frequency of the interferer back to radio frequency. In many systems, the frequency of the local oscillator can change depending on the channel that is desired to be received. The interferer frequency at radio frequency can be the local oscillator frequency plus or minus the interferer frequency assessed at baseband.

The analysis of the run-lengths of the sign (positive or negative) of a signal can be used as a crude estimate of the spectrum of arbitrary signals, after the run-lengths are converted to frequencies, according to Equation 2. This analysis, illustrated with the aid of the histogram, should be limited to spectra with relatively few dominant peaks.

One application of the invention is in the field of wireless radio receivers; however, the interference scanner can be used for spectrum estimation for arbitrary signals.

Various embodiments have been described above. Although described with reference to these specific embodiments, the descriptions are intended to be illustrative and are not intended to be limiting. Various modifications and applications may occur to those skilled in the art.

What is claimed is:

1. A method of assessing a radio frequency (RF) interferer, the method comprising:
processing a baseband signal to generate hard-decision samples of at least ones and zeroes, wherein the baseband signal comprises a downconverted desired signal and a downconverted interferer, the downconverted desired signal corresponding to a desired signal and the downconverted interferer corresponding to the RF interferer;
observing a plurality of consecutive ones or zeroes to tabulate run lengths of ones or zeroes from the hard-decision samples, and collecting a frequency of occurrence distribution of the run-lengths observed; and
inferring at least one of an RF frequency of the RF interferer or a signal strength of the RF interferer relative to a signal strength of the desired signal based at least partly on the collected frequency of occurrence distribution.

2. The method of claim 1, further comprising inferring the at least one of the RF frequency or the signal strength based on a peak occurrence in the collected frequency of occurrence distribution.

3. The method of claim 1, further comprising inferring the RF frequency by:
inferring a baseband frequency of the downconverted RF interferer from the frequency of occurrence distribution; and
using a frequency associated with downconverting to map the inferred baseband frequency to one or more RF frequencies.

4. The method of claim 3, wherein further comprising inferring the baseband frequency of the downconverted RF interferer by:
constructing a theoretical peak occurrence run-length from at least a peak occurrence in the frequency of occurrence distribution; and
using a frequency of sampling and the theoretical peak occurrence run-length to infer the baseband frequency of the downconverted RF interferer.

5. The method of claim 3, wherein further comprising inferring the baseband frequency by using a frequency of sampling and a peak occurrence run-length in the frequency of occurrence distribution to infer the baseband frequency of the downconverted RF interferer.

6. The method of claim 1, further comprising inferring the signal strength of the RF interferer relative to the signal strength of the desired signal by:
constructing a theoretical peak occurrence run-length based on the frequency of occurrence distribution;
using a peak occurrence associated with the theoretical peak occurrence run-length to infer the signal strength of the RF interferer relative to the signal strength of the desired signal.

7. The method of claim 1, further comprising extrapolating from the run-lengths observed to generate a non-natural number estimate of a run length estimated to have a peak occurrence.

8. The method of claim 7, further comprising generating the non-natural number estimate by:
determining a first point, a second point, and a third point, wherein the first point corresponds to a first run-length having a highest number of occurrences, wherein the second point corresponds to a second run-length value adjacent to the first run-length, wherein the third point corresponds to a third run-length value also adjacent to the first run-length, wherein the second run-length value has a lower count than the third run-length;
determining a first line defined by the first point and the second point, the first line having a first slope;
determining a second line defined by the third point and by a second slope that is equal to, but opposite in sign to the first slope; and
determining the non-natural number estimate to lie at an intersection of the first line and the second line.

9. The method of claim 1, further comprising assessing effectiveness of a notch filter based at least partly on the inferred RF frequency.

10. The method of claim 1, further comprising assessing effectiveness of a notch filter based at least partly on the collected frequency of occurrence distribution.

11. An apparatus for assessing a radio frequency (RF) interferer, the apparatus comprising:
a slicer coupled to a baseband signal, wherein the baseband signal comprises a downconverted desired signal and a downconverted interferer, wherein the downconverted desired signal corresponding corresponds to a desired signal and the downconverted interferer corresponding corresponds to the RF interferer, wherein the slicer is configured to generate hard-decision samples of ones and zeroes;
an interference scanner configured to observe a plurality of consecutive ones or zeroes from the hard-decision samples, to tabulate run lengths of the ones or zeroes, to collect a frequency of occurrence distribution of the run-lengths observed, and to infer at least one of an RF frequency of the RF interferer or a signal strength of the RF interferer relative to a signal strength of the desired signal based at least partly on the collected frequency of occurrence distribution.

12. The apparatus of claim 11, wherein the interference scanner is further configured to infer the at least one of the RF frequency or the signal strength based on a peak occurrence in the collected frequency of occurrence distribution.

13. The apparatus of claim 11, wherein the interference scanner is further configured to infer a baseband frequency from the frequency of occurrence distribution, and to map the inferred baseband frequency to one or more RF frequencies based at least partly on a frequency associated with downconversion.

14. The apparatus of claim 13, wherein the interference scanner is further configured to construct a theoretical peak occurrence run-length from at least a peak occurrence in the frequency of occurrence distribution, and to infer the baseband frequency of the downconverted RF interferer based at least partly on a frequency of sampling and the theoretical peak occurrence run-length.

15. The apparatus of claim 13, wherein the interference scanner is further configured to infer the baseband frequency of the downconverted RF interferer based at least partly on a frequency of sampling and a peak occurrence run-length in the frequency of occurrence distribution.

16. The apparatus of claim 11, wherein the interference scanner is further configured to construct a theoretical peak occurrence run-length based on the frequency of occurrence distribution, and to infer the signal strength of the RF interferer relative to the signal strength of the desired signal based at least partly on a peak occurrence associated with the theoretical peak occurrence run length.

17. The apparatus of claim 11, wherein the interference scanner is further configured to extrapolate from the run-lengths observed to generate a non-natural number, more precise estimate of a peak occurrence run length.

18. The apparatus of claim 17, wherein the interference scanner is further configured:
to determine a first point, a second point, and a third point, wherein the first point corresponds to a first run-length having a highest number of occurrences, wherein the second point corresponds to a second run-length value adjacent to the first run-length, wherein the third point corresponds to a third run-length value also adjacent to the first run-length, wherein the second run-length value has a lower count than the third run-length;
to determine a first line defined by the first point and the second point, the first line having a first slope;
to determine a second line defined by the third point and by a second slope that is equal to, but opposite in sign to the first slope; and
to determine the non-natural number estimate to lie at an intersection of the first line and the second line.

19. An apparatus for assessing a radio frequency (RF) interferer, the apparatus comprising:
a slicer coupled to a baseband signal, wherein the baseband signal comprises a downconverted desired signal and a downconverted interferer, wherein the downconverted desired signal corresponding corresponds to a desired signal and the downconverted interferer corresponding corresponds to the RF interferer, wherein the slicer is configured to generate hard-decision samples of ones and zeroes; and
means for observing a plurality of consecutive ones or zeroes to tabulate run lengths of ones or zeroes from the hard-decision samples, collecting a frequency of occurrence distribution of the run-lengths observed, and inferring at least one of an RF frequency of the RF interferer or a signal strength of the RF interferer relative to a signal strength of the desired signal based at least partly on the collected frequency of occurrence distribution.

20. An apparatus comprising:
a slicer coupled to a baseband signal, wherein the slicer is configured to generate hard-decision samples of ones and zeroes of the baseband signal;
a processor; and
a computer program executable by the processor embodied in a tangible non-transitory computer readable medium, wherein the computer program embodies a method of assessing a radio frequency (RF) interferer, the method comprising: observing a plurality of consecutive ones or zeroes to tabulate run lengths of ones or zeroes from the hard-decision samples of the baseband signal and collecting a frequency of occurrence distribution of the run-lengths observed; and
inferring at least one of an RF frequency of the RF interferer or a signal strength of the RF interferer relative to a signal strength of a desired signal based at least partly on the collected frequency of occurrence distribution.

* * * * *